(12) United States Patent
Chen et al.

(10) Patent No.: US 8,327,274 B2
(45) Date of Patent: Dec. 4, 2012

(54) METHOD AND APPARATUS FOR CUSTOMIZING A MODEL ENTITY PRESENTATION BASED ON A PRESENTATION POLICY

(75) Inventors: Lei Chen, Beijing (CN); Wei Liu, Beijing (CN); Zhihong Ren, Beijing (CN); Hui Zhang, Beijing (CN); Sen Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/135,605

(22) Filed: Jun. 9, 2008

(65) Prior Publication Data
US 2009/0031229 A1    Jan. 29, 2009

(30) Foreign Application Priority Data
Jul. 26, 2007   (CN) .......................... 2007 1 0138152

(51) Int. Cl.
*G06F 3/00*   (2006.01)
(52) U.S. Cl. ........................................... 715/747
(58) Field of Classification Search .................. 715/744, 715/745, 771, 772, 853
See application file for complete search history.

(56) References Cited

U.S. PATENT DOCUMENTS

| | | | |
|---|---|---|---|
| 6,144,962 A | 11/2000 | Weinberg et al. | |
| 6,348,935 B1 | 2/2002 | Malacinski et al. | |
| 6,496,208 B1 | 12/2002 | Bernhardt et al. | |
| 2006/0044319 A1 | 3/2006 | Molesky et al. | |
| 2007/0185865 A1* | 8/2007 | Budzik et al. | 707/5 |
| 2008/0313173 A1* | 12/2008 | Popper | 707/5 |

* cited by examiner

*Primary Examiner* — Thanh Vu
(74) *Attorney, Agent, or Firm* — Elissa Y. Wang; Edell, Shapiro & Finnan, LLC

(57) ABSTRACT

A method and device are provided for customizing a model entity presentation based on a presentation policy. The method comprises: applying the presentation policy to a first model to generate a presentation model; creating a model entity thereof according to the first model; reading model content from the first model and reading presentation data from the presentation model; and applying the read model content and presentation data to the model entity. The presentation model and core model of data are separated, and their association may be configured through a presentation policy in real-time during operation. The real-time and dynamic configuration of the method and device provide enhanced flexibility for users.

20 Claims, 8 Drawing Sheets

METHOD AND APPARATUS FOR CUSTOMIZING A MODEL ENTITY PRESENTATION BASED ON A PRESENTATION POLICY

CROSS REFERENCE TO RELATED APPLICATIONS

This application claims priority under 35 U.S.C. §119 to Chinese Patent Application No. 200710138152.8 filed on Jul. 26, 2007, entitled "Method and Apparatus for a Policy Based Customizable Coloring Mechanism for Tree Structure to Facilitate Business Modeling", the entire contents of which are hereby incorporated by reference.

BACKGROUND

The present invention embodiments relate to a method and device for customizing a model entity (user interface (UI)) presentation, and in particular, to a method and device for customizing a model entity based on a presentation policy.

A model is a primary entity of a model-driven architecture. To some extent, developing a system includes describing and defining the system. One of the defining approaches is to use a program design language, and another approach is to use a model to describe each aspect of the system. Each of the two approaches has its strong and weak points, and the approach of using a model is more abstract and effective. A model is a kind of abstract description for objects. A description of a system is abstract, since a designer can not and need not represent all aspects of the real world. In other words, the system is composed of models. A simple definition of a model is that the model is data concerning data (i.e., metadata as usually used). A model for defining a model is a meta-model, and further, a model for defining a meta-model is referred to as a meta-meta-model.

FIG. 1 is a schematic diagram of a structure of models on each layer.

In FIG. 1, an M0 layer refers to entities in the system, an M1 layer includes models of the system, an M2 layer includes meta-models, and an M3 layer includes a meta-meta-model. The M3 layer is used to define models used by, for example, Unified Modeling Language (UML), Domain-Specific Language (DSL), which are self-described models.

According to the four-layer structure, in all model definitions, reading and accessing of a model can be preformed through a presentation frame for model of Facility (MOF), as long as the meta-model for defining the model can be consistent with the MOF standard.

In known modeling systems, a tree view is a model often used to represent hierarchical data. A different UI presentation is used for the tree view. For example, an approach is to use different node icons, colors, fonts, and sizes to customize a presentation of the tree.

A method and system for representing hierarchical data are described in U.S. Pat. No. 6,496,208, in which a TREE PROVIDER object is included. This object supports tree representation of hierarchical data, and also provides a "score" for each node. This score is used to determine a color of the node, and such a score can be modified by UI control. Each node may have different scores, and represent different colors. Such a mechanism may be used by the user to find trends and abnormalities in data, and such a color code may be used to describe features and properties of the tree node. A property is related to a color, so that different colors may refer to different characteristic values. In the aforementioned '208 patent, a data structure is described by a tree structure, and the user may adjust the presentations of data, such as color and size of words, by adjusting control components, so as to describe the same data with different presentations. However, the model in the '208 patent is fixed and the presentation of which is bonded with its core model. Such a structure makes customization of the coloring scheme limited.

That is, in known methods, since the core model of a tree structure is fixed and corresponds with the fixed hierarchical data, the known coloring customization processes adopted in these methods are relatively fixed.

After constructing a dynamic tree model, the foregoing and existing color customization mechanisms can not accommodate such demands. Besides, in known methods (e.g., products of PureComponents TreeView), a new tree structure (core model) may be created, but the coloring supported by it can only apply a preset color scheme. When there are other coloring demands, the color, font and size of a single node can only be modified manually. Also, the existing products and technologies can not dynamically modify models in runtime and support the coloring schemes corresponding to the dynamic models in real time.

BRIEF SUMMARY

The present invention embodiments provide a method of customizing a model entity presentation based on a presentation policy comprising: applying the presentation policy to a first model to generate a presentation model; creating a model entity thereof according to the first model; reading model content from the first model and reading presentation data from the presentation model; and applying the read model content and presentation data to the model entity. The present invention embodiments also provide a device for customizing a model entity presentation based on a presentation policy in substantially the same manner described above.

The above and further features and advantages of the present invention will become apparent upon consideration of the following definitions, descriptions and descriptive figures of example embodiments thereof, wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

In known software designs, modeling on the M1 layer is mainly considered by the software designer. On such a layer, the core model and the presentation model of a model are bonded completely (i.e., each node on the model is assigned one representation of the model). Under such designing approaches, the presentation customization of the model may be limited.

In the present invention embodiments, the presentation model is built on the M2 layer. Thus, the presentation model may be better combined with a dynamic M1 model. Since the M2 model is a basic extension of the M3 model, it can be suitable for virtually all modeling tools that use MOF.

In the present invention embodiments, a DSL meta-model (core model) is defined (i.e., an M2 meta-model is defined first, and the DSL meta-model inherits the MOF).

Figure 1:
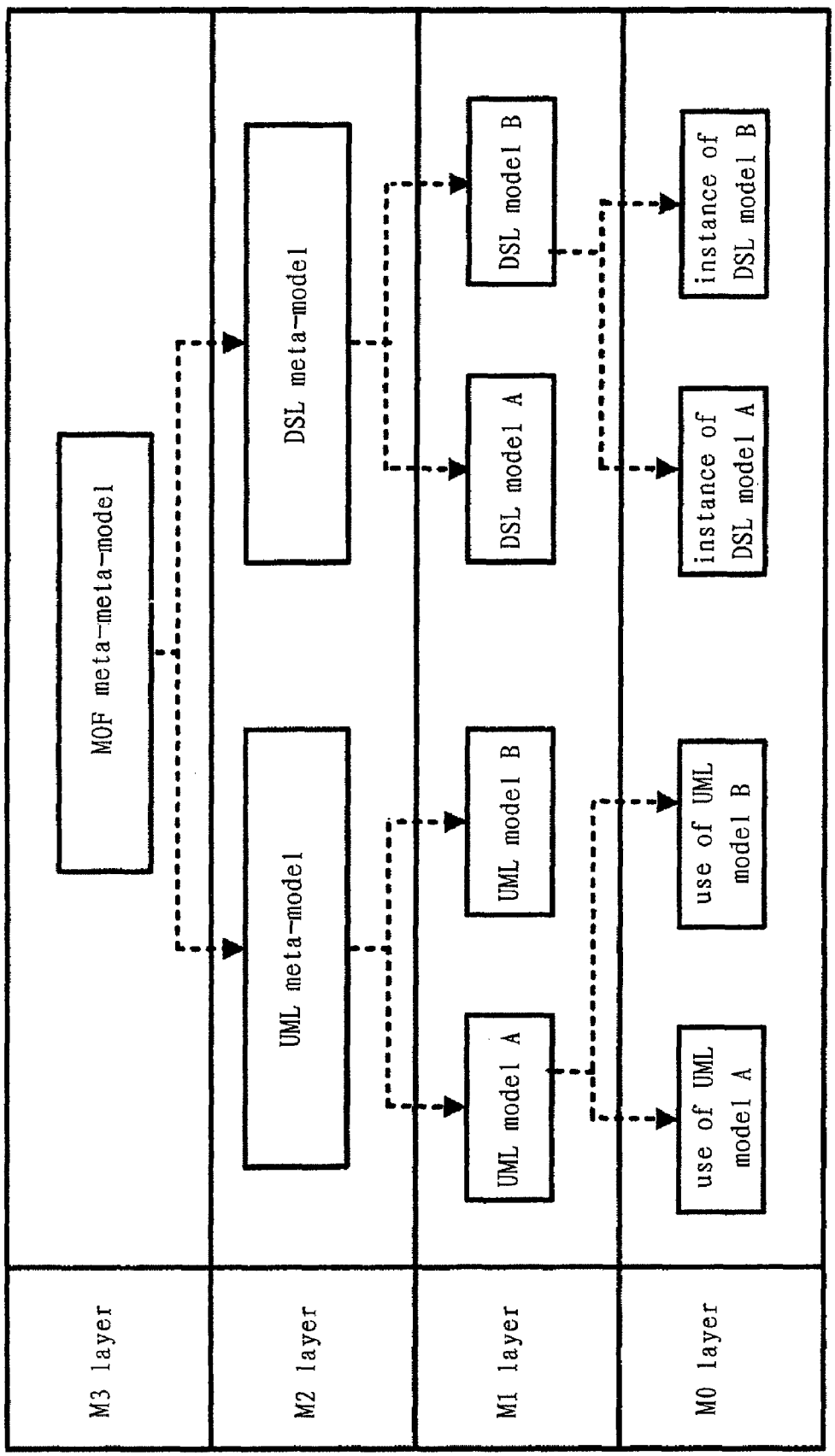
FIG. 1 is a schematic diagram of the structure of models on each layer.
Figure 2:
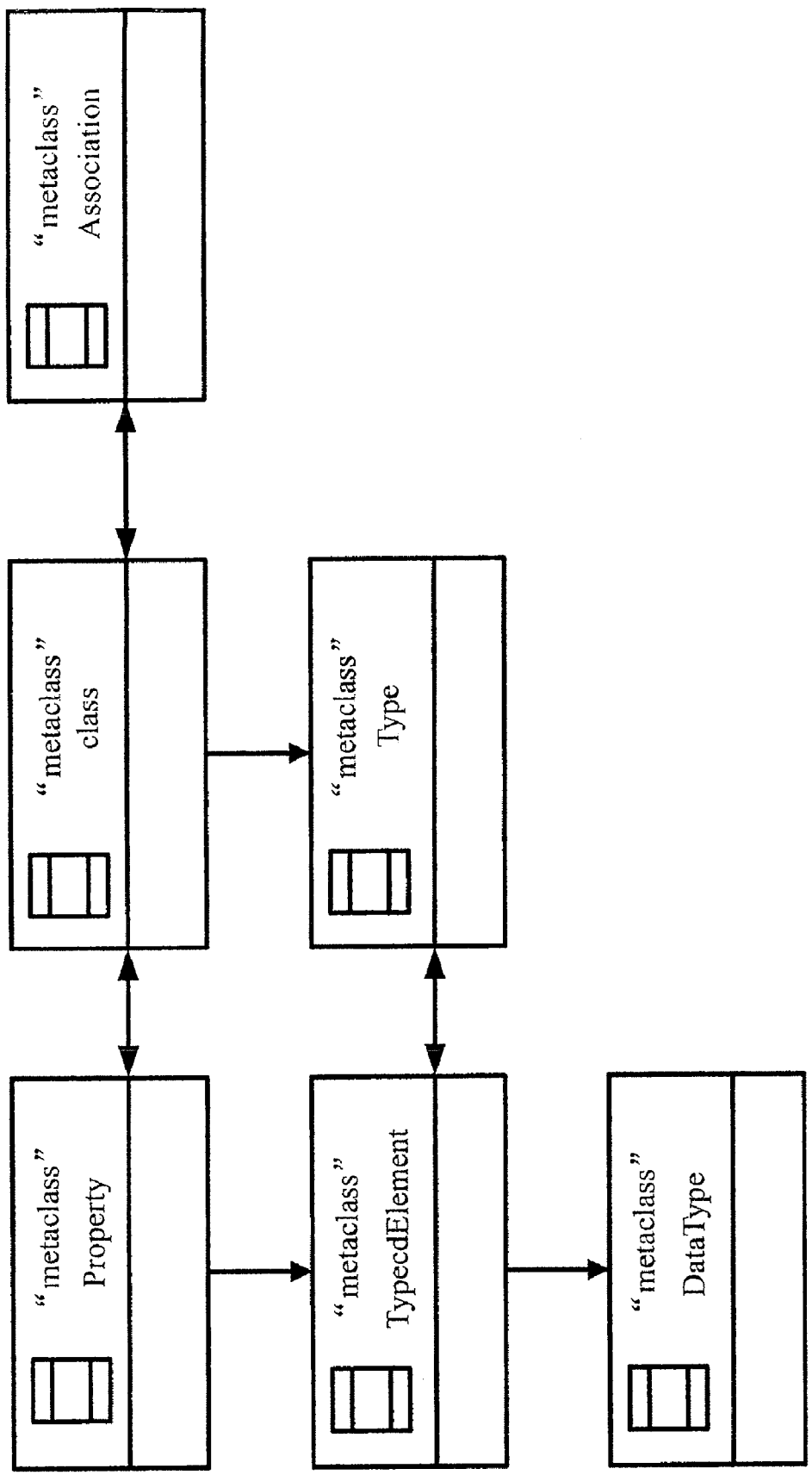
FIG. 2 is a view of an M2 DSL meta-model according to an embodiment of the invention.

FIG. 2 is a view of the M2 DSL meta-model according to an embodiment of the invention.

As shown in FIG. 2, a model element CLASS is defined, which has a model type (Type), a model property (Property), and a model association (Association). The model property includes more detailed contents, such as TypecdElement and DataType. Based on this DSL meta-model, different Domain Models (M1 models) may be created.

Figure 3A:
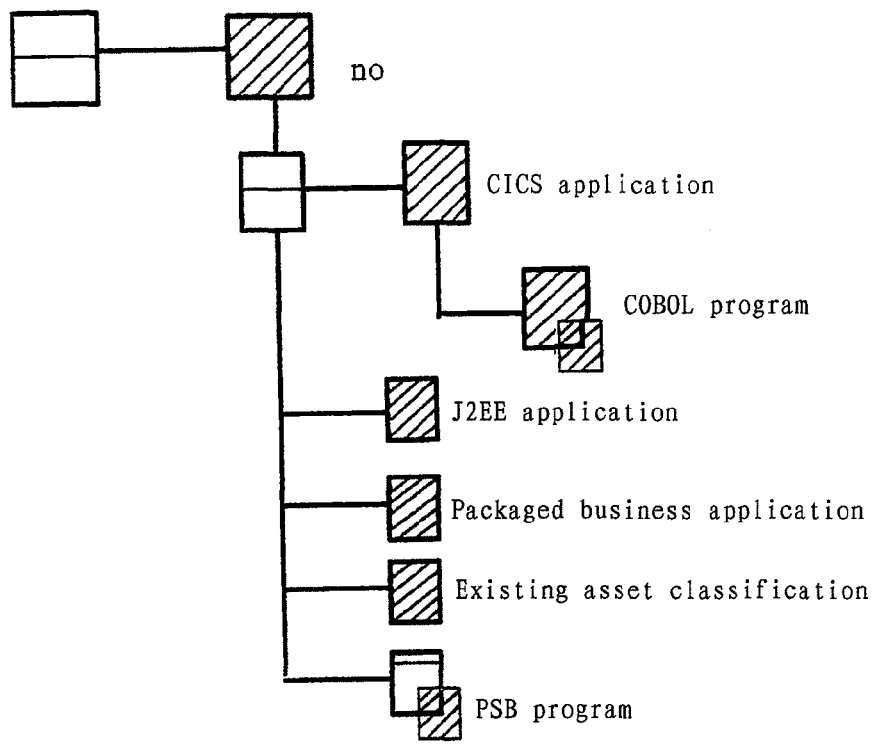
FIGS. 3a and 3b are diagrams of two different tree models (M1 model) implemented according to an embodiment of the invention.
Figure 3B:
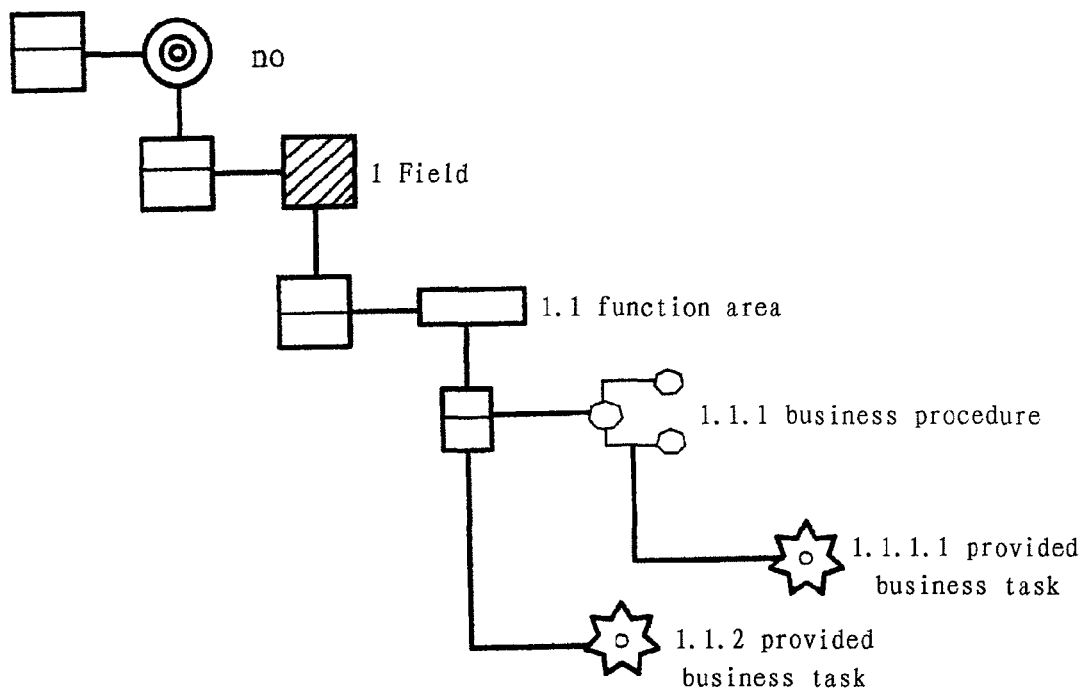

FIGS. 3a and 3b are diagrams of two different tree models (M1 models) implemented according to an embodiment of the invention.

The two different model examples describe an IT system model (FIG. 3a) and a business domain model (FIG. 3b), respectively. Multiple different model entities (M0) may be created with the two models to describe the system. Since in the system of the present invention embodiments the meta-model is used to describe a tree structure, multiple different tree models may be generated easily by customization.

Figure 4:
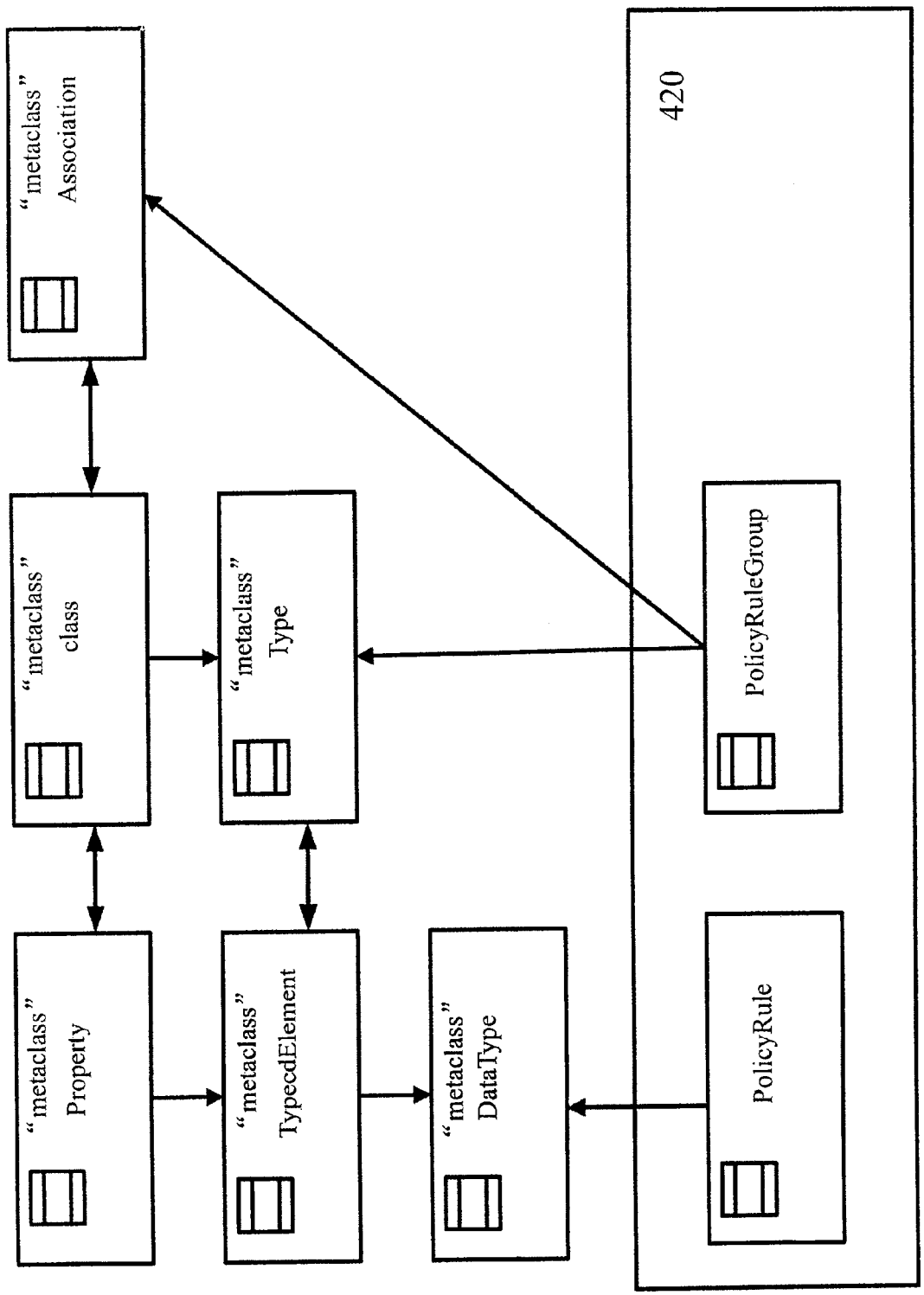
FIG. 4 is a diagram showing association of a presentation model and an M2 model according to an embodiment of the invention.

FIG. 4 is a diagram showing association of a presentation model and an M2 model according to an embodiment of the invention.

In this figure, a presentation (policy) model (on the M2 layer) 420 includes a presentation policy (PolicyRule) and policy group (PolicyRuleGroup), which may be associated with nodes, node types and node relations in the core model. The policy therein may also be associated with a certain particular element of node properties. Thus, an association is created between the core model and the presentation model. When a new node appears in the tree-structure model generated based on the core model, a presentation policy is configured only for the new node and the presentation of the new node and relations thereof may be supported in real time. This is a significant improvement as compared to the fixed core model and presentation model in known systems. Comparing with known products (e.g., PureComponents TreeView), the present invention embodiments may customize color styles arbitrarily, and the customization of these color styles may not only support nodes, and node relations, but also configure the node properties.

Figure 5:
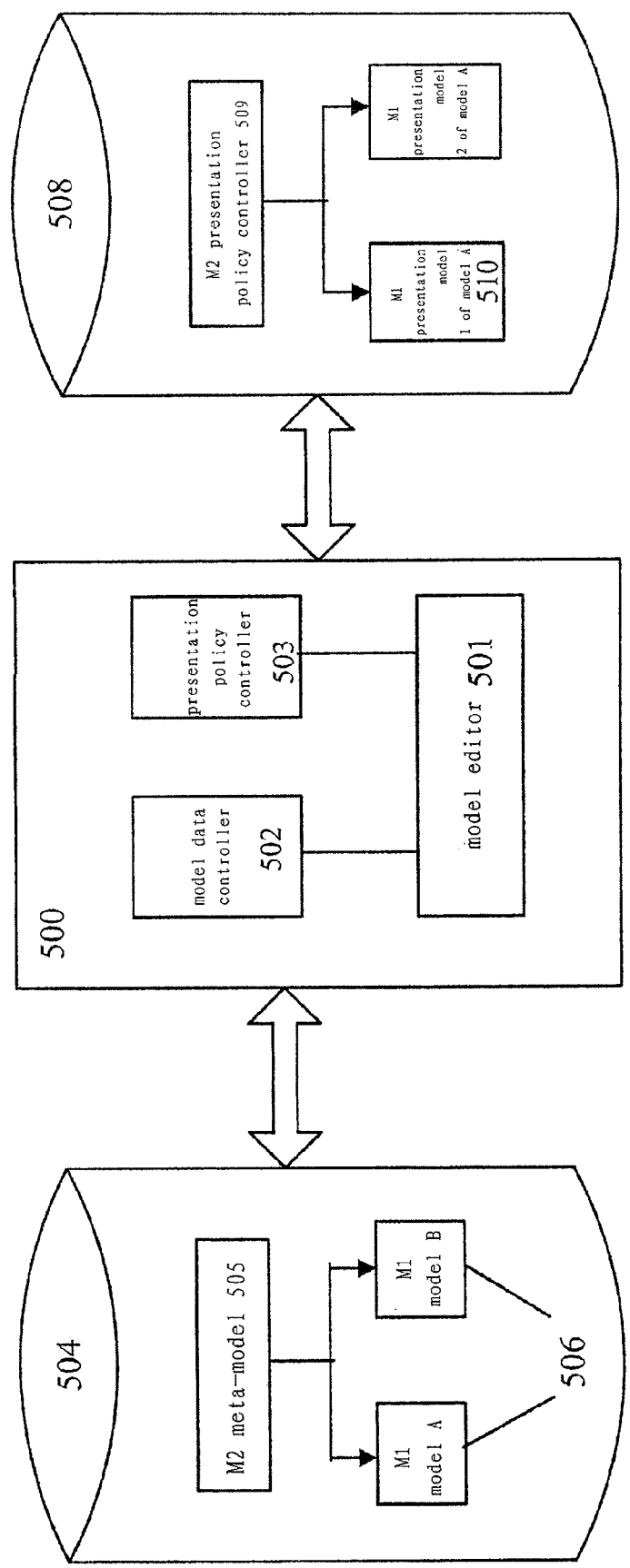
FIG. 5 is a block diagram of a device for customizing a model entity presentation based on a presentation policy according to an embodiment of the invention.

FIG. 5 is a block diagram of a device for customizing a model entity presentation based on a presentation policy according to an embodiment of the invention.

The device according to this embodiment may be implemented by adding an extension to the traditional model tools. Furthermore, functions and elements well known by those skilled in this art will not be described in detail here so as not to confuse the contents of the present invention embodiments.

As shown in FIG. 5, the device 500 of an invention embodiment comprises: a model editor 501 for applying a presentation policy selected from a presentation policy model (i.e., presentation model of the M2 layer) to the M1 model 506 to generate an M1 presentation model 510; a model data controller 502 for reading a model content from the M1 model 506; and a presentation policy controller 503 for reading presentation data from the M1 presentation model 510. In the above device 500, the model editor 501 creates an M0 model entity based on the M1 model 506, and applies the model content read by the model data controller 502 and the presentation data read by the presentation policy controller 503 to the M0 model entity, so as to present the M0 model entity.

Below, a detailed description will be made to the device 500 of an invention embodiment.

In FIG. 5, the reference numeral 504 refers to the core model, which comprises a M2 meta-model 505 and M1 models 506 generated based on the M2 meta-model 505. The M1 models 506 may be multiple, such as M1 model A and M1 model B. A user may create the M1 model 506 with the model editor 501 based on the core model (i.e., M2 meta-model 505). The user may also create the M1 model 506 through other ways known to those skilled in the art and the particular manner does not limit the scope of the present invention embodiments.

M1 model 506 is an extension model of M2 meta-model 505. M1 model 506 is a model abstract associated with a specific business field by a user according to the user business knowledge. Multiple M1 models 506 may be customized from each M2 model 505, and each of these M1 models 506 may be used to create a model entity M0. M0 is a real model entity created by the user based on the M1 model 506.

The reference numeral 508 refers to the presentation model, which comprises a presentation policy model 509 of M2 meta-model 505 and a presentation model 510 of M1 model 506. Various presentation policies may be applied to one M1 model 506 to generate multiple M1 presentation models 510, such as, M1 presentation 1 and M1 presentation 2 (510) generated based on M1 model A 506. The above multiple presentation policies are the presentation policies created by the user for presenting the M2 meta-model 505, and are included in the presentation policy model 509. As described previously, the presentation policies in the presentation policy model 509 may be associated with each node, node type, and node relation in the M2 meta-model.

In the embodiments of the present invention, the model editor 501 creates an association between the core model 504 and the presentation model 508. In particular, in one embodiment, the model editor 501 creates an association between the M2 meta-model 505 and the M2 presentation policy model 509. Further, the model editor 501 reads the M1 model 506 through its interface (not shown) to obtain the M1 model 506.

The model editor 501 adds a corresponding presentation policy selected from the M2 presentation policy model 509 to the model content of M1 model 506, which is obtained according to the M2 meta-model 505, by using the association between the M2 meta-model 505 and the M2 presentation policy model 509, so as to generate the M1 presentation model 510 (may be multiple, and two in the figure). In one embodiment, a reference relation is created between the M1 presentation model 510 and the M1 model 506 by the model editor 501.

The model content comprises: node, node relation, node property, node type, node relation type, node relation property, property type, and the like.

The model property depends on the model definition of the M1 model. For example, if one node is defined as a server in the M1 model, the property of this node may, for example, comprise: an operating system being used, internal memory, speed, size of appearance, weight, and the like.

The presentation policy is a condition defining the presentation manner of the model content, and may comprise a model property expression and a presentation form thereof. The presentation policy may be combined to form a presentation policy group. The presentation policy of the invention embodiments can support various presentation forms.

The above presentation forms may be, for example, a node icon, word background, word format, size, color, as well as color, thickness and form of lines connecting the nodes, etc.

In the present invention embodiments, on the basis of the M1 model 506, the model editor 501 may create the M0 model entity with real data to be presented. Also, the model editor 501 applies the presentation data (data formed by applying the presentation policy to the M1 model 506) to the M0 model entity. When different presentation policies and presentation forms are chosen, different M0 model entities are actually determined.

In the present invention embodiments, the M1 presentation model 510 may be stored as an Extensible Markup Language (XML) file, which may be easily shared among users using the same tool.

In the present invention embodiments, the model editor 501 may have an interface (not shown) for being operated by the users to achieve the following functions:

(1) establishing association between elements of the core model 504 and the presentation model 508;

(2) creating and modifying the presentation model 508, wherein since each core model 505, 506 may comprise multiple presentation policies, the user may select and add multiple presentation policies for one or more M1 presentation models 510 (in one embodiment, a corresponding presentation policy may be selected by a selection of a drop-down menu, where different presentation models are represented);

(3) establishing an interface to obtain the core model 504;

(4) supporting respective expressions for elements of the core model 504; and (5) storing the editing results of the model editor 501 as the presentation model 510.

The model editor 501 may configure different presentation policies for nodes, node relations, node properties, etc. in the model. In configuration of the node relations and node properties, various expressions may be supported.

The model data controller 502 is used to control the core model 504. It reads the model content from the M1 model 506, and provides the read model content to the presentation policy controller 503. Optionally, it may also provide the read model content to the model editor 501 directly. The M1 model 506, by way of example, is an M1 model serving as the basis of the created M0 model entity.

The presentation policy controller 503 is used to process the presentation model 508. In particular, the presentation policy controller 503 reads the M1 presentation model 510, and extracts the presentation data of corresponding nodes, node relations, and node properties from the M1 presentation model 510 (the data formed by applying the presentation policy to the M1 model 506).

The presentation policy controller 503 provides the presentation data extracted from the presentation model 510 and the model content received from the model data controller 502 to the model editor 501.

The model editor 501 obtains the model content of the M1 model 506 and the presentation data of its corresponding M1 presentation model 510, and applies the model content and the presentation data of the M1 presentation model 510 to the M0 model entity created by the model editor 501, so as to present the M0 model entity. In one embodiment, the device 500 of an invention embodiment may also include a display unit (not shown), and through the process of the display unit, the created M0 model entity (e.g. a user interface) is displayed on, for example, a display.

The structure of the device 500 of the present invention embodiments does not limit the scope of those embodiments. For example, it may include a separate model reader for exhibiting the M0 model entity created by a user with the model editor 501.

Figure 6:
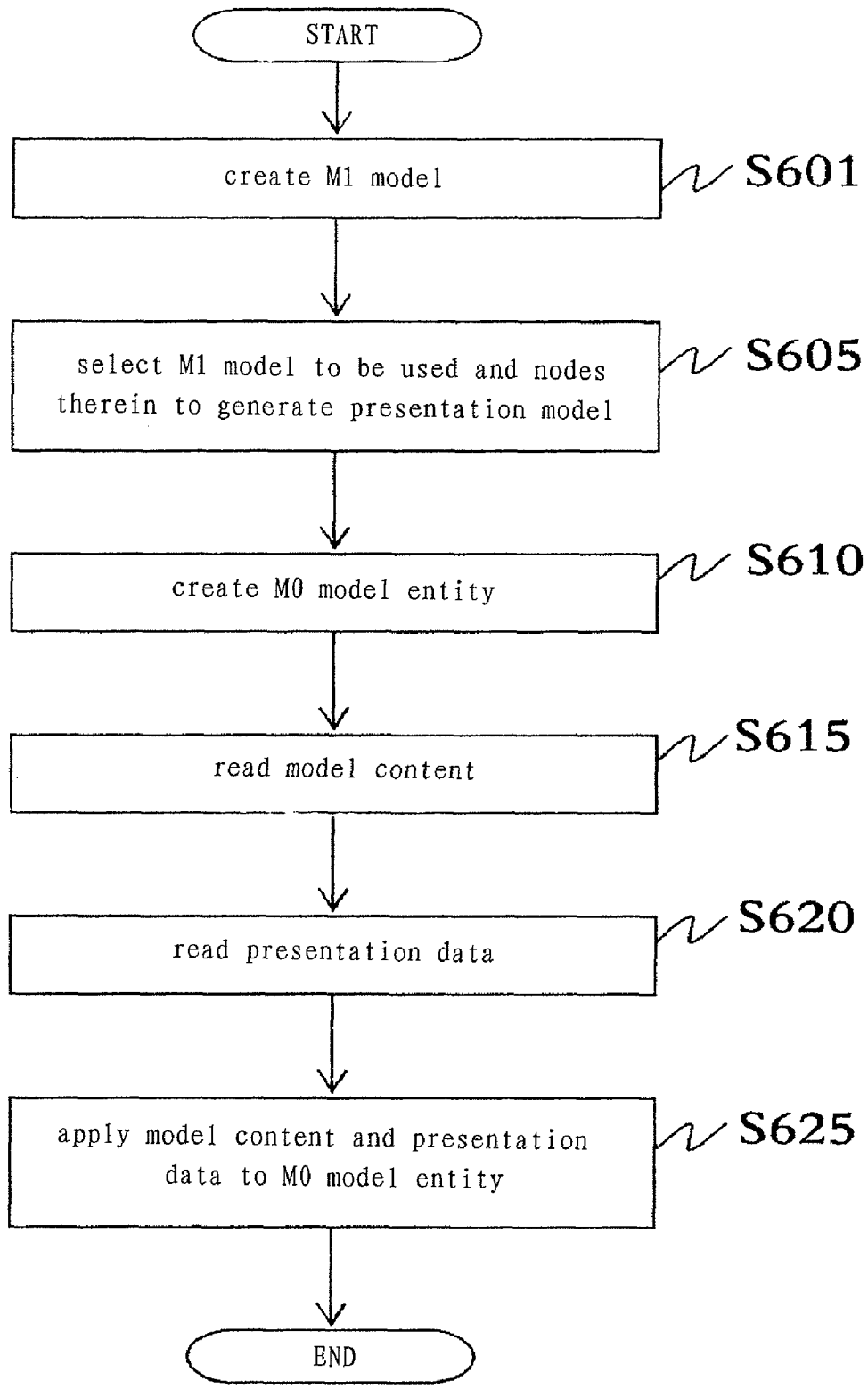
FIG. 6 is a flow chart of a method of customizing a model entity presentation based on a presentation policy according to an embodiment of the invention.

FIG. 6 is a flow chart of a method of customizing a model entity presentation based on a presentation policy according to an embodiment of the invention.

As shown in FIG. 6, at step S601, one or more M1 models 506 are created according to the M2 meta-model 505, and the M1 model 506 may be used in modeling a certain field.

At step S605, one M1 model 506, which is obtained according to the M2 meta-model 505, and nodes therein to be used are selected, and one or more presentation policies are selected from the presentation policy model 509 for the created M1 model 506. The selected presentation policies are applied to the M1 model 506 to generate presentation model 510 of the M1 model.

An example of the presentation policy model 509 may be, for example, the presentation model 420 in FIG. 4, which includes presentation policies created for M2 meta-model 505 and a presentation policy group containing a logical combination of these presentation policies. In one embodiment, the presentation model 420 and presentation policies therein may have been created by the system in advance.

In the selection of nodes, the node, node property, and node relation may be selected. The user may customize different presentation policies with respect to different selections of nodes as described above. For example, for a selected model node, the user may customize a presentation policy according to the type of the node; for a selected node property, the user may create a presentation policy by logically manipulating the node property; for a selected node relation, the user may define a presentation policy according to the type of the node relation or the property of the node relation.

While creating the presentation policy, the user may select a corresponding presentation form.

For the presentation policy, the user may also combine different presentation policies by creating an expression to generate the presentation policy group customized for the M1 model 506.

As described above, the presentation form herein may be, for example, a node icon, a background of a word of the node, word format, size, color, as well as color, thickness and form of lines that connects the nodes.

The user may repeat the above operations to add more presentation policies (including presentation forms).

Below is a procedure of customizing a model entity presentation.

At step S610, the user creates a corresponding M0 model entity with the model editor 501, based on the selected M1 model 506 and the selected nodes, and adds corresponding model properties to the M0 model entity.

At step S615, the model data controller 502 reads model content (e.g., node, node relation, node property, node type, node relation type, node relation property, property type, etc.) from M1 model 506.

At step S620, the presentation policy controller 503 reads presentation data (i.e., data formed by applying the presentation policy to the M1 model 506) from the M1 presentation model 510.

At step S625, the user may apply the model content read by the model data controller 502 from the M1 model 506 and the presentation data read by the presentation policy controller 503 from the M1 presentation model 510 to the M0 model entity created by the model editor 501. Thus, the M0 model entity may display various effects with respect to different presentation data.

The above procedure may be widely used in specific modeling fields. With support to the MetaTooling, the multiple fields analyzing method may be supported expediently.

It should be noted that the sequence of steps in the above flow chart does not limit the scope of the present invention embodiments, and may be implemented in any sequence, in parallel or individually.

Also, the step S601 in FIG. 6 does not limit the scope of the present invention embodiments. The creation operation of one or more M1 models 506 may be performed by the system in advance, and is not necessary to be included in the flow of the above method.

Below, the above method of the present invention embodiments is illustrated with an example.

It is assumed there is an M1 model which describes an organizational hierarchy of a company that contains the following contents: president, vice-president, principal of the department, and employee of the department. These model contents correspond to respective nodes in the model, and the M1 model as shown in FIG. 7 can be defined.

Figure 7:
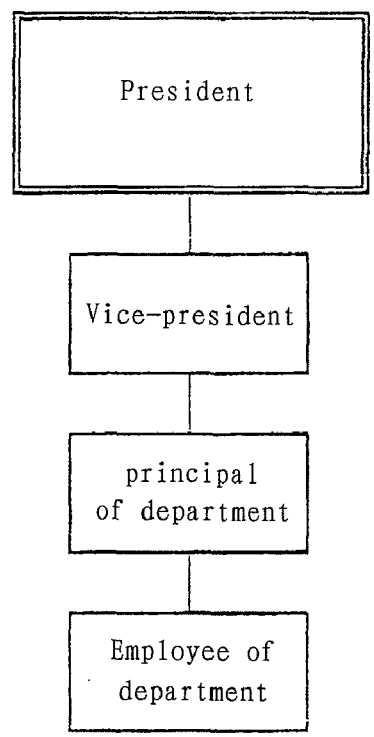
FIG. 7 is an example of an M1 model according to an embodiment of the invention.

FIG. 7 is an example of the M1 model according to an embodiment of the invention.

In the model, each model node has common properties such as age, gender, marriage, working years, salary, etc. For specific model nodes, there may be different dedicated properties. For example, members above vice president may further have dedicated properties such as allotted car, brand of the car, age limit, and the like. A corresponding M0 model entity may be generated according to this model, as shown in FIG. 8.

Figure 8:
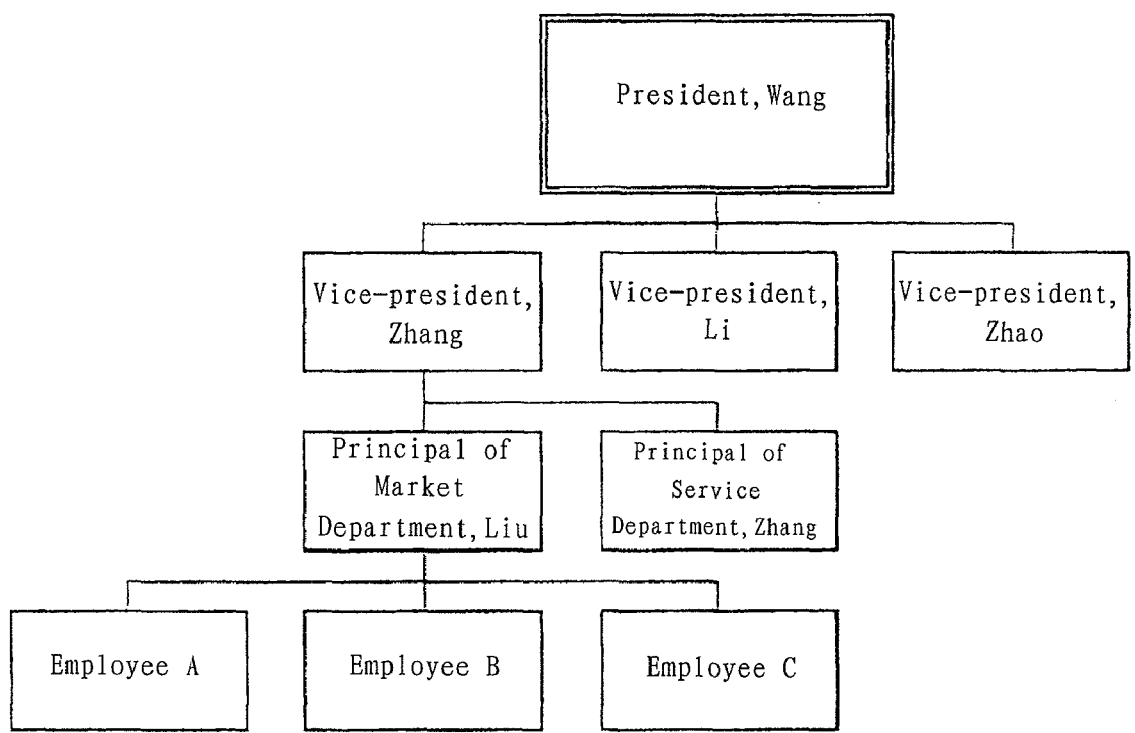
FIG. 8 is an example of an M0 model entity according to an embodiment of the invention.

FIG. 8 is an example of the M0 model entity according to an embodiment of the invention.

A series of presentation policies and presentation forms may be configured, such as:

Policy 1: all males with allotted cars are marked in blue; and

Policy 2: all females who are not married are marked in pink.

The front halves of these policies are expressions for the node properties, that is, "all males with allotted cars" and "all females who are not married". Expressions for node properties may be suitable for common properties as well as dedicated properties. The back halves are the presentation forms (i.e., "marked in blue" and "marked in pink").

The final presentation of the model depends on the above customized presentation policies. For example, FIG. 9 and FIG. 10 are final results, wherein all males with allotted cars are marked in blue, and all females who are not married are marked in pink.

Figure 9:
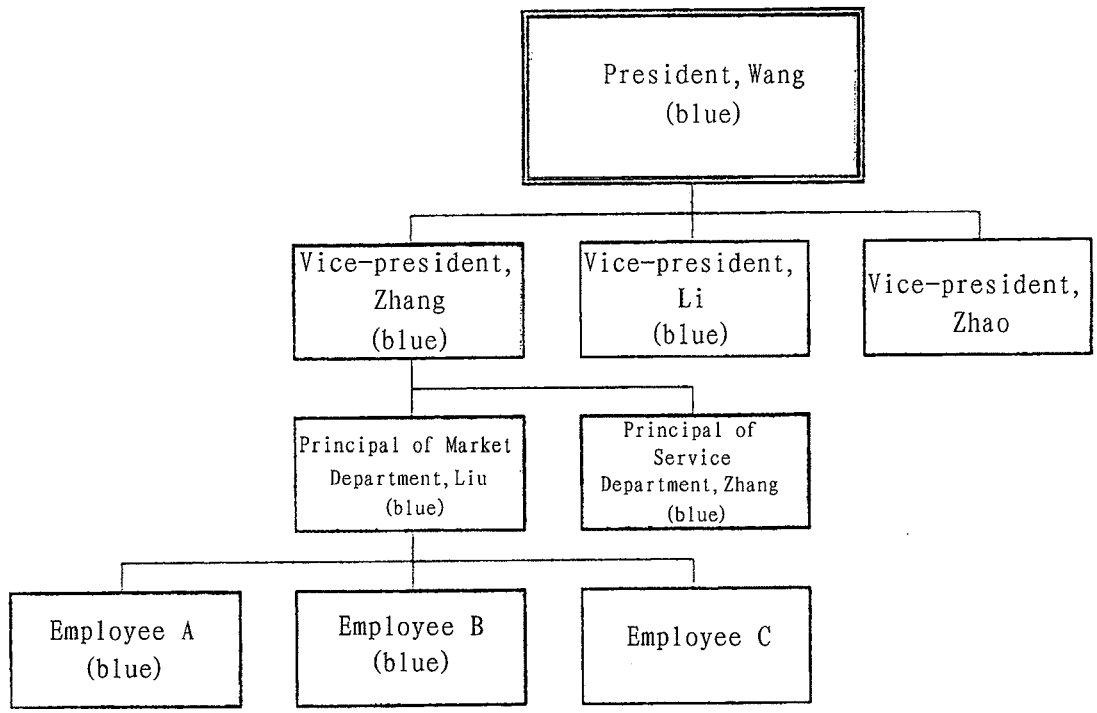
FIG. 9 is an example of the presentation result of the M0 model entity according to an embodiment of the invention.

FIG. 9 is an example of the presentation result of the M0 model entity according to an embodiment of the invention.

Figure 10:
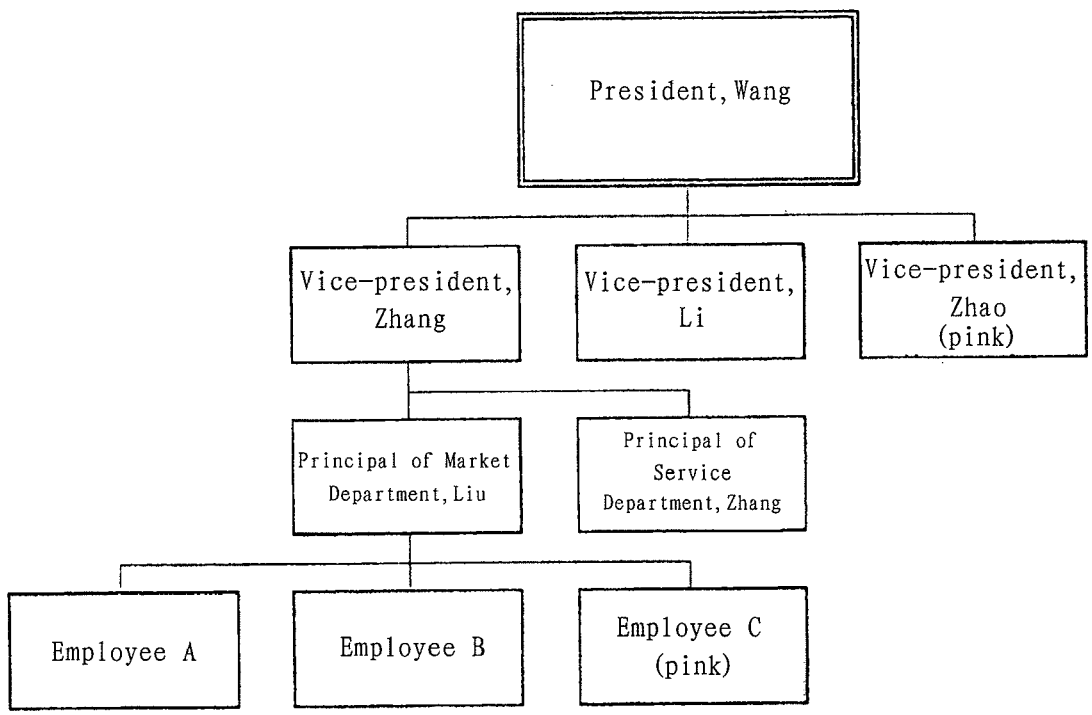
FIG. 10 is another example of the presentation result of the M0 model entity according to an embodiment of the invention.

FIG. 10 is another example of the presentation result of the M0 model entity according to an embodiment of the invention.

The present invention embodiments are not directed to a particular fixed data model. The presentation model of data is separated from the core model of data, and the association between them may be configured in real time through a presentation policy during runtime (i.e., real-time configuration and presentation during operation). The presentation policy of the present invention embodiments is strongly extensible, and can be configured to nodes, node relations, and properties of the relations. The presentation policy of the present invention embodiments may support various presentation forms, such as at least one of: a node icon, a word background, a word format, a size, a color, and a color, thickness and form of the line connecting nodes. Theoretically, any user interface (UI) tools can support the UI presentation of tree structures. The presentation of the present invention embodiments may also support expressions which are based on various properties. A better degree of freedom may be provided to the users with the dynamic and real-time configuration of the present invention embodiments.

It should be noted that the embodiments of the present invention may be implemented by hardware (e.g., computer or processing system, processors, circuitry, logic, etc.), software, or a combination thereof, and the implementation does not limit the scope of the present invention embodiments.

While some embodiments of the present invention have been shown and described in detail in connection with figures, it is to be understood by those skilled in the art that changes and variations may be made to these embodiments without departing from the spirit or scope of the following claims and the equivalents thereof.

What is claimed is:

1. A method of customizing a model entity presentation based on a presentation policy comprising:

creating a plurality of first models according to a second model including elements with information defining a structure and hierarchical arrangement of elements for the first models;

associating elements of the second model with a presentation policy model including presentation policies, wherein the presentation policies indicate display characteristics controlling a visual appearance for presented elements;

applying the presentation policies to the elements of the first models to generate a corresponding presentation model for each of the first models based on the association between the elements of the second model and the presentation policy model, wherein the corresponding presentation models provide different customized display characteristics for the first models and corresponding model entities created from those first models, and wherein each presentation model associates each of one or more individual elements of a corresponding first model with one or more corresponding display characteristics controlling a visual appearance of a presented element;

creating a model entity according to a first model, wherein the model entity includes actual data pertaining to an entity and the first model includes elements with information defining a structure and hierarchical arrangement of elements for the model entity;

reading model content from said first model and reading presentation data from said corresponding presentation model; and applying the read model content and presentation data to said model entity to present elements of the model entity including the actual data with a visual appearance in accordance with the associated display characteristics of corresponding individual elements of the first model, wherein at least two elements of the model entity are presented with different display characteristics within a presentation.

2. The method of claim 1, further comprising:
selecting a presentation policy from the presentation policy model.

3. The method of claim 2, further comprising:
creating said presentation policy for said second model to form said presentation policy model, wherein said presentation policy is associated with each of a node, node type, and node relation of said second model.

4. The method of claim 2, wherein said second model is a meta-model.

5. The method of claim 1, wherein said model content includes at least one of a node, node relation, node property, node type, node relation type, node relation property, and node property type.

6. The method of claim 1, wherein a presentation policy includes a model property expression and presentation form thereof indicating said display characteristics, said presentation form including at least one of a node icon, word background, word format, size, color, and the color, thickness and form of lines that connect nodes.

7. A device for customizing a model entity presentation based on a presentation policy comprising:
a model editor to:
create a plurality of first models according to a second model including elements with information defining a structure and hierarchical arrangement of elements for the first models;
associate elements of the second model with a presentation policy model including presentation policies, wherein the presentation policies indicate display characteristics controlling a visual appearance for presented elements; and
apply the presentation policies to the elements of the first models to generate a corresponding presentation model for each of the first models based on the association between the elements of the second model and the presentation policy model, wherein the corresponding presentation models provide different customized display characteristics for the first models and corresponding model entities created from those first models, and wherein each presentation model associates each of one or more individual elements of a corresponding first model with one or more corresponding display characteristics controlling a visual appearance of a presented element;
a data controller to read model content from a first model; and
a presentation policy controller to read presentation data from said corresponding presentation model;
wherein said model editor:
creates a model entity of said first model based on said first model, wherein the model entity includes actual data pertaining to an entity and the first model includes elements with information defining a structure and hierarchical arrangement of elements for the model entity; and
applies the model content read by the data controller and the presentation data read by the presentation policy controller to said model entity including the actual data to present elements of the model entity with a visual appearance in accordance with the associated display characteristics of corresponding individual elements of the first model, and wherein at least two elements of the model entity are presented with different display characteristics within a presentation.

8. The device of claim 7, wherein said model editor selects a presentation policy from the presentation policy model to apply to said first model to generate said corresponding presentation model.

9. The device of claim 8, wherein said presentation policy is associated with each of a node, node type, and node relation of said second model.

10. The device of claim 8, wherein said second model is a meta-model.

11. The device of claim 7, wherein said model editor comprises a user interface.

12. The device of claim 7, further comprising a display unit configured to present said model entity.

13. The device of claim 7, wherein said model content includes at least one of a node, node relation, node property, node type, node relation type, node relation property, and node property type.

14. The device of claim 7, wherein a presentation policy includes a model property expression and presentation form thereof indicating said display characteristics, said presentation form including at least one of a node icon, word background, word format, size, color, and the color, thickness and form of lines that connect nodes.

15. A computer readable memory device including software that when executed by a processor is operable to:
create a plurality of first models according to a second model including elements with information defining a structure and hierarchical arrangement of elements for the first models;
associate elements of the second model with a presentation policy model including presentation policies, wherein the presentation policies indicate display characteristics controlling a visual appearance for presented elements;
apply the presentation policies to the elements of the first models to generate a corresponding presentation model for each of the first models based on the association between the elements of the second model and the presentation policy model, wherein the corresponding presentation models provide different customized for the first models and corresponding model entities created from those first models, and wherein each presentation model associates each of one or more individual elements of a corresponding first model with one or more corresponding display characteristics controlling a visual appearance of a presented element;
create a model entity according to a first model, wherein the model entity includes actual data pertaining to an entity and the first model includes elements with information defining a structure and hierarchical arrangement of elements for the model entity;
read model content from said first model and read presentation data from said corresponding presentation model; and
apply the read model content and presentation data to said model entity including the actual data to present elements of the model entity with a visual appearance in accordance with the associated display characteristics of corresponding individual elements of the first model, wherein at least two elements of the model entity are presented with different display characteristics within a presentation.

16. The memory device of claim 15, wherein the software is further operable to:
   select a presentation policy from the presentation policy model.

17. The memory device of claim 16, wherein the software is further operable to:
   create said presentation policy for said second model to form said presentation policy model, wherein said presentation policy is associated with each of a node, node type, and node relation of said second model.

18. The memory device of claim 16, wherein said second model is a meta-model.

19. The memory device of claim 15, wherein said model content includes at least one of a node, node relation, node property, node type, node relation type, node relation property, and node property type.

20. The memory device of claim 15, wherein a presentation policy includes a model property expression and presentation form thereof indicating said display characteristics, said presentation form including at least one of a node icon, word background, word format, size, color, and the color, thickness and form of lines that connect nodes.

* * * * *